United States Patent Office 3,174,085
Patented Mar. 16, 1965

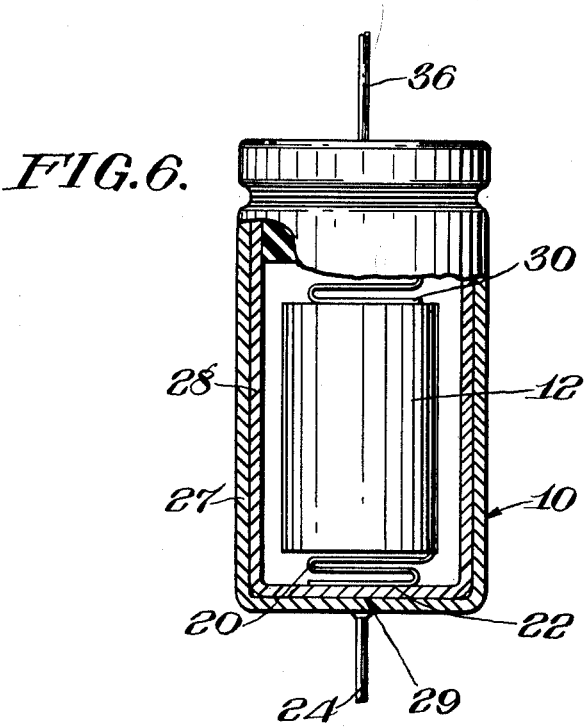

3,174,085
CAPACITOR CONSTRUCTION
Walter W. Schroeder, Jr., Williamstown, Mass., and William A. Owczarski, Colonie, N.Y., assignors to Sprague Electric Company, North Adams, Mass., a corporation of Massachusetts
Filed Jan. 11, 1960, Ser. No. 1,781
5 Claims. (Cl. 317—230)

The invention relates to electrical capacitors and particularly to capacitor constructions having metallic housings or enclosures.

The present invention is a continuation-in-part of U.S. Patent Application Serial No. 623,007 filed November 19, 1956, in the name of W. W. Schroeder, Jr. and W. A. Owczarski, now abandoned.

The above-identified patent application relates to a capacitor with a metal housing having a capacitance section with a tab-type terminal within the housing which terminal is welded to the internal surface of the housing. The capacitance section can be convolutely wound foils, one of which is welded or mechanically swedged to an aluminum rod about 1/16 inch thick located axially of the section and projecting out from one end of the section. The other foil is welded, bonded or mechanically attached to an aluminum tab which is welded at one point to the inner surface of the closed end of an aluminum can having an open end and which houses the section. The rod projects through the open end of the can and a rubber grommet surrounds the rod and fills the open end of the can. The wall of the can adjacent the open end is deformed against the grommet to seal that end shut. A lead is butt-welded to the end of the rod, and is not more than about half as thick as the rod.

The leads used in the above construction are preferably of tinned copper wire not more than about 1/32 inch thick with one end of the wire being ball-shaped or hemispherical and having an enlarged collar or flange extending about the ball which faces said end. The ball-shaped end permits point contact of the lead to the outer surface of the closed end of the can to ensure localized heating during the welding operation. The flange permits securing and indexing of the lead within an electrode of the welder. More will be said about this feature herebelow.

A very convenient way to assemble the above capacitors is to provide the capacitance section with at least one outwardly extending tab which is inserted into the metal can that is a close fit for the unit after which a portion of the tab is welded to the inner surface of the can. Simultaneously, the solderable lead is welded to the outer surface of the can. The unit is then inserted into the can and the welded tab is simultaneously folded up after which the open end of the can is sealed.

Where the capacitor is of the electrolytic kind, one of the foils has an in situ formed oxide coating and the can is filled with an electrolyte, as described for example in U.S. Patent 2,757,140, granted July 31, 1956, to F. H. Bush.

The above constructions are particularly suited for miniature types of capacitors, for example those having an overall housing diameter of less than ½ inch and overall height of less than 1 inch. It has been successfully used in constructions having an outer can diameter of 3/16 inch and an overall length of ½ inch.

The present invention has similar objects but differs in one way from the above capacitor structures in the manner in which the lead wire extending beyond the open end of the can is subsequently connected with the capacitance section.

In addition, a folded tab terminal is also provided at the open end portion of the can which replaces the rod of the parent case structure to provide connection between the capacitance section and, subsequently, the lead wire.

A further difference over the above described capacitor structures lies in the manner and structure by which the open end of the can is tightly sealed.

In addition, both terminal tabs may be welded in place simultaneously with their leads when assemblying the capacitor.

The capacitor structure of the present invention is illustrated in the accompanying drawing in which.

Figure 5:
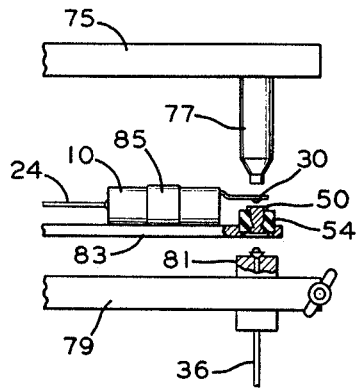
Figure 4:
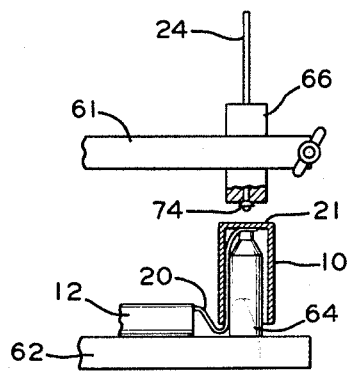

FIG. 4 is a detail partially in section showing how one of the tab terminals and the first lead are simultaneously secured to the inner and outer surface respectively of the closed end of the can housing; and FIG. 5 is a detail partially in section showing how the other tab terminal and the second lead are simultaneously welded in place at the opposite end of the capacitance section; and FIG. 6 is a section of still a further embodiment of the invention.

Figure 1:
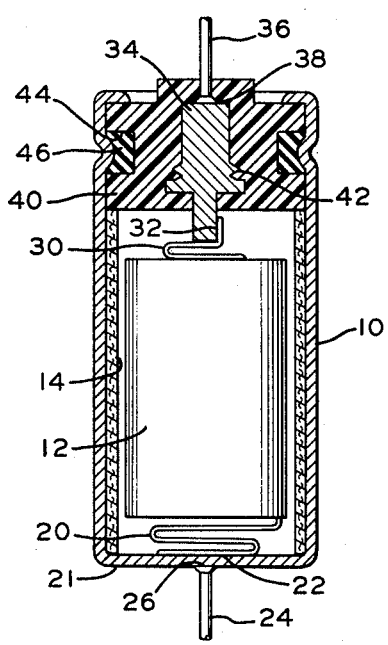
FIG. 1 is a section of a typical capacitor according to the invention.
Figure 2:
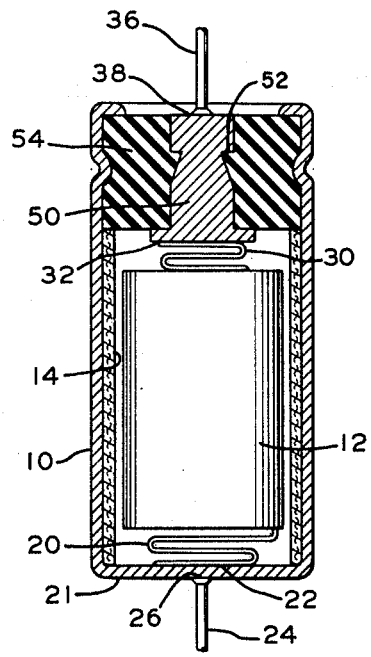
FIG. 2 is a section of an embodiment of the capacitor of FIG. 1.

As seen in the drawing, the capacitor of FIGS. 1 and 2 have a metal housing in the form of a can 10, of aluminum for example, in which is contained a capacitance section 12 of a convolutely wound assembly of foil and spacer elements. A protective liner 14 of paper or the like can be used to keep the can from undesired intermittent engagement with the section 12. Liner 14 may be omitted by attaching the tab to the outer foil of the capacitor section, so as to maintain the outer foil at the same potential as the can.

The make-up of section 12 with regard to the type of electrode foils and spacers which are wound together to form the capacitor is of the type described in the U.S. Patent 2,869,052 to O. A. Ness et al. issued January 13, 1959.

A valve-metal tab 20, such as aluminum, provides one terminal for capacitance section 12. Tab 20 is staked or otherwise connected to one of the foil electrodes of the section 12. The portion of tab 20 that extends beyond the end of capacitance section 12 is folded over with its outer end welded as at 22 to the inside surface of the can 10. An external lead wire 24 for the can is welded in place at 26.

A second folded valve-metal tab terminal 30 extends from the opposite end of the section 12, being connected to the other electrode foil of the section 12. The opposite end of the tab 30 is spot-welded as at 32 in FIG. 1 to the base or innermost surface of a generally cylindrical shaped conductor plug 34 lying axially of the can 10 and formed of a valve-metal, such as aluminum. An external lead wire 36 of a material capable of accommodating a solder connection to an electrical circuit, for example tinned copper, is butt-welded as at 38 to the outer surface of the plug 34.

As further seen in FIG. 1, the plug 34 except for its base portion is encased or embedded in a generally cylindrically shaped bushing 40 which is formed of a nonconducting material such as a hard synthetic thermosetting plastic material. The plastic material used for the bushing may be diallyl phthalate, melamine, formaldehyde, phenol formaldehyde, and other suitable resins.

Plug 34 includes at least one inwardly tapering groove 42 which is formed by cutting out spaced apart circumferential portions of the plug 34. Grooves 42 serve to increase the length of the electrolyte leakage path through bushing 40. When molded in place, the molten plastic material which forms the bushing 40 is forced into the grooves. After cooling, the plug 34 is firmly anchored and sealed within the bushing 40.

To provide a seal between the bushing 40 and can 10 adjacent the open end thereof, the hard bushing 40 has a circumferential rounded indent 44 therein. A resilient O-ring 46, preferably formed of natural or synthetic rubber, is lodged in indent 44. During the sealing operation, the edge of can 10 rolled over against the top of bushing 40, and the O-ring 46 is squeezed and compressed by inward spinning of the wall of the can, whereby a tight seal is formed to provide a leak-proof construction. As seen in FIG. 1, the can 10 is indented in that area overlying the O-ring which gives a better locking arrangement of the can to the bushing.

The embodiment shown in FIG. 2 differs from that of FIG. 1 in that the plug 50 is exposed at both ends of bushing 54. Plug 50 is provided with at least one flange 52 to increase the length of the electrolyte leakage path. The flanges also serve to anchor plug 50 in the bushing 54 which is formed of a material which is slightly resilient such as natural or synthetic rubber.

The bushing 54 is compressed around its periphery as the open end of can 10 is rolled over onto the top of the bushing and the side wall of can 10 is spun into the side of the resilient bushing, whereby a tight seal is formed between the bushing and the confining side wall of can 10 to provide a leak-proof construction.

The outer surface of the conductor plug 50 is approximately flush with the bushing surface and the external lead-wire 36 is welded thereto as at 38. Due to the resiliency of the material, the side wall of bushing 54 is smooth and does not require the rounded indent 44 of the bushing 34 in FIG. 1. The open end of the can 10 is rolled over into contact with the bushing 54 to lock the components in place within the can 10. The operation of spinning the wall of can 10 into plug 54 gives a grooved external appearance to the component that is similar to the external appearance of the component of FIG. 1.

Both leads 24 and 36, as mentioned before, are preferably made of readily solderable metal such as copper that has ben tinned by either dipping in molten tin or molten solder, or by electrolytic plating with tin or its alloys.

The capacitor sections may be impregnated by conventional impregnation processes prior to assemblying the capacitor. Any impregnant that adheres to the tab is removed during the welding procedures so that no special protective coatings are required during impregnation. If desired, an impregnant can be placed in can 10 before the section is inserted, or the assembly can be impregnated with vacuum-type impregnation even after the final assembly but before sealing.

The construction of the present invention can be used with nonelectrolytic type of capacitor where the impregnation need only be used to reduce corona problems. With nonelectrolytic capacitors the housing or can 10 can be of any desired metal including steel and brass in addition to aluminum. For electrolytic capacitors the housing 10 should have at least its inner surface of such character that it is compatible with the electrolytes, that is a surface that does not deteriorate and is not attacked by the electrolytes. Aluminum, tantalum and silver make good surfaces for this purpose. However, the can need not be of uniform composition, but can have a multi-layered wall such as 27, 28 shown in FIG. 6, only the inner layer of which meets the above requirements. Such laminated wall construction is readily provided by merely having a plurality of cans dimensioned so that one fits or nests inside of another and the internal one provides the desired inert characteristics. The welding of joint 22 with or without joint 26 will then automatically weld the corresponding portions of the nested cans together as at 29.

Figure 3:
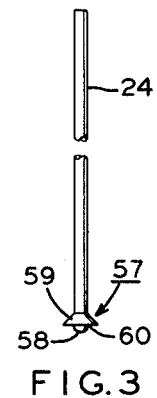
FIG. 3 is a view of the external lead used in the present invention.

The welding operations are performed as follows. Very effective butt-welding of the lead 24 is obtained when, as seen in FIG. 3, the head 57 of the lead 24 which is to be secured to the exterior of the can 10 has a ball shaped end 58 that stands out about 5 to 20 mils from a collar 59 presenting a flat surface 60 facing ball 58. In this way, the tail of lead 24 need not be more than $\frac{1}{32}$ of an inch thick, 20 mils or less is adequate, and yet the lead will adhere very tenaciously to the can surface. This appears to help with the welding as well as increase the strength of the welding joint particularly against flexing.

The welding of external lead 24 may be accomplished simultaneously by the same welding operation that welds tab 20 to the inner surface of can 10. This welding operation is illustrated in FIG. 4 of the drawing. Here, there is shown a pair of spot welding electrodes 61 and 62. Electrode 62 carries an anvil-like support 64 which is dimensioned so that can 10 will slip over the end and rest with its closed end 21 on top of the support and with its mouth lifted up from the arm of electrode 62.

The section 12 is then placed on arm 62 adjacent support 64 and the tab 20 connected therewith is folded in, up the side of the support and over its top. This tab is thin enough to be readily folded and once folded will retain its folded shape and tend to stay in position. The can 10 is then slipped over the support as illustrated in the figure and the lower electrode is ready for the welding.

The upper electrode 61 is prepared for welding by clamping in it the terminal lead 24 with the head 57 facing the outer surface of the can wall 21. An apertured support 66 is used with electrode 61 so as to hold the head 74 at a predetermined distance with respect to electrode arm 62.

The welding operation of FIG. 4 can then be carried out and will simultaneously weld tab 20 to the inside surface and head 74 to the outside surface of wall 21. The lead 24 can then be unclamped and the welded assembly removed from the welding apparatus. All that need be done now is to insert the section 12 along into the can and then roll in the cam mouth. The insertion of the section will automatically cause the tab 20 to fold in the accordion-like manner indicated in FIG. 1. The same method and apparatus may be used to simultaneously weld the tab 20 and lead 24 of the structure of FIG. 2 to the can 10.

In welding the other tab terminal 30 to the opposite end of the section 12 and to the plugs 34 and 50 of the structures of FIGS. 1 and 2, the lead 36, with regard to the structure of FIG. 1, which is of the same type as lead 24 is welded first to the outer surface of the plug 34 after which the plug and lead are placed in a mold into which a thermosetting resin, as described above, is poured whereby all but the inner surface of the plug 34 is embedded in the resin which subsequently hardens to form the bushing 40. After one end of the tab terminal 30 has been welded to the electrode of the section 12, the free end of the tab terminal 30 is welded to the exposed base surface of the plug 34 after which the bush 40 is inserted in the open end of the can 10 which is then rolled over the bushing. The tab 30 folds over as the bushing is inserted in the mouth of the can 10.

Concerning the welding of the tab 30 and lead 36 to the plug 50 of the structure shown in FIG. 2, suitable apparatus is shown in FIG. 5 whereby the terminal tab 30 and lead 36 may be welded simultaneously to the exposed base surface and the exposed outer surface respectively of the plug 50.

As seen in FIG. 5, the upper spot-welding electrode 75 supports a depending anvil 77 while the lower electrode 79 supports a clamp 81 which holds the external lead-wire 36 to be applied. The lead-wire 36 is of the same construction as the lead-wire 24 shown in FIG. 3.

A fixed support 83 lies between the electrodes 75 and 79 to support the can 10 as it is received from the welding apparatus shown in FIG. 4 of the drawing. To ensure rapid alignment, the can 10 may be held in place on the support 83 by a clamp 85. The free end of the terminal tab 30 lies adjacent the base side of the plug 50 embedded in the bush 54 which is in turn supported in fixed position in a supporting opening through one end of support 83 as shown in FIG. 5. The weldable end of lead-wire 36 lies adjacent the outer exposed surface of the plug 50. When the welding electrodes are operated and move toward one another, the tab 30 and the lead-wire 36 are simultaneously welded to opposing sides of the plug 50.

Obviously, many modifications and variations of the present invention are possible in the light of the above teachings. It is, therefore, to be understood that within the scope of the appended claims the invention may be practiced otherwise than as specifically described.

What is claimed is:

1. A welded capacitor comprising a metal can housing having an open end, a first external lead welded to the housing exterior, a capacitance unit within the housing, a hard bushing of insulating material positioned within the open end of the housing for sealing off the housing, a circumferentially extending indent in the surface of the bushing, a resilient O-ring seated in the indent which forms a seal between the can and the bushing, an inwardly depressed area in the can wall which is urged against the O-ring, a conductor plug substantially embedded within the bushing, said plug having circumferential locking grooves filled by said bushing, an external lead welded to the outer surface of the plug, a folded tab-type terminal of valve metal for one of the electrodes of the capacitance unit being welded to the inside of the can surface opposite the first external lead, and a second folded tab-type terminal of valve metal for the other electrode of the capacitance unit which terminal is welded to the inner surface of said conductor plug.

2. A welded capacitor comprising a metal can housing having an open end, a first external lead welded to the housing exterior, a capacitance unit within the housing, a resilient bushing of insulating material positioned within the open end of the housing for sealing off the housing, an inwardly depressed area in the can wall which is urged against the resilient bushing, a conductor plug substantially embedded within the bushing, said plug having at least one flange extending therefrom embedded in said resilient bushing, an external lead welded to the outer surface of the plug, a folded tab-type terminal of valve metal for one of the electrodes of the capacitance unit being welded to the inside of the can surface opposite the first external lead, and a second folded tab-type terminal of valve metal for the other electrode of the capacitance unit which terminal is welded to the inner surface of said conductor plug.

3. A welded capacitor comprising a metal can housing having an open end and a closed end, a first external lead welded to the housing exterior, a capacitance unit within the housing, means formed of insulating material positioned within the open end of the housing for sealing off the can housing, a resilient circumferential surface for at least a portion of the can sealing means, the side of said can being depressed inwardly against this resilient surface to form a tight seal between the can and the sealing means, a conductor plug supported by said sealing means, a second external lead welded to the outer surface of said plug, a folded tab-type terminal of valve metal connected with one of the electrodes of the capacitance unit being welded to the inside of the can surface opposite the first external lead, and a second folded tab-type terminal of valve metal connected with the other electrode of the capacitance unit which terminal is welded to the inner surface of said conductor plug.

4. A welded capacitor comprising a metal can housing having an open end and a closed end, a first external lead welded to the housing exterior, a capacitance unit within the housing, means positioned within the open end of the housing for sealing off the can housing, a conductor plug supported by said sealing means, a second external lead welded to the outer surface of said plug, a folded tab-type terminal of valve metal connected with one of the electrodes of the capacitance unit being welded to the inside of the can surface opposite the first external lead, and a second folded tab-type terminal of valve metal connected with the other electrode of the capacitance unit which terminal is welded to the inner surface of said conductor plug, said leads being butt-welding leads of tinned copper wire not more than about 1/32 inch thick, one end of the wire being ball-shaped to provide a substantially point contact surface, an an enlarged collar having a substantially flat annular face about 1/16 inch in overall diameter extending about the ball and facing said end.

5. A welded capacitor comprising a metal can housing having an open end and a closed end, a first external lead welded to the housing exterior, a capacitance unit within the housing, means positioned within the open end of the housing for sealing off the can housing, a conductor plug supported by said sealing means, a second external lead welded to the outer surface of said plug, a folded tap-type terminal of valve metal connected with one of the electrodes of the capacitance unit being welded to the inside of the can surface opposite the first external lead, and a second folded tab-type terminal of valve metal connected with said other electrode of the capacitance unit which terminal is welded to the inner surface of said conductor plug, said closed end of said can being of multi-layer construction, the layers being welded together.

References Cited in the file of this patent

UNITED STATES PATENTS

| | | |
|---|---|---|
| 2,225,801 | Schnoll | Dec. 24, 1940 |
| 2,227,319 | Pontis | Dec. 31, 1940 |
| 2,309,563 | Abeel | Jan. 26, 1943 |
| 2,776,467 | Brennan | Jan. 8, 1957 |
| 2,825,855 | Frekko | Mar. 4, 1958 |

FOREIGN PATENTS

| | | |
|---|---|---|
| 778,853 | Great Britain | July 10, 1957 |